(12) United States Patent
Shimazawa et al.

(10) Patent No.: US 11,996,126 B2
(45) Date of Patent: May 28, 2024

(54) IRIDIUM FILM WITH A THIN IRIDIUM TEMPLATE LAYER FOR A HEAT-ASSISTED MAGNETIC RECORDING (HAMR) WRITER

(71) Applicant: Headway Technologies, Inc., Milpitas, CA (US)

(72) Inventors: Koji Shimazawa, Cupertino, CA (US); Shengyuan Wang, San Jose, CA (US); Yukinori Ikegawa, Cupertino, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 17/957,304

(22) Filed: Sep. 30, 2022

(65) Prior Publication Data
US 2024/0112693 A1   Apr. 4, 2024

(51) Int. Cl.
G11B 5/31 (2006.01)
B82Y 20/00 (2011.01)
G02B 5/00 (2006.01)
G11B 7/1387 (2012.01)
G11B 5/00 (2006.01)

(52) U.S. Cl.
CPC .............. G11B 5/314 (2013.01); B82Y 20/00 (2013.01); G02B 5/008 (2013.01); G11B 5/3163 (2013.01); G11B 7/1387 (2013.01); G11B 2005/0021 (2013.01)

(58) Field of Classification Search
None
See application file for complete search history.

(56) References Cited

U.S. PATENT DOCUMENTS

| 4,016,601 | A  | * | 4/1977  | Lazzari   | G11B 5/3116 360/122 |
| 8,588,040 | B1 | * | 11/2013 | Fujita    | G11B 5/102 369/13.13 |
| 8,947,986 | B1 | * | 2/2015  | Araki     | G11B 5/314 369/13.13 |
| 2011/0222190 | A1 | * | 9/2011 | Hara      | G11B 5/6088 360/234.6 |
| 2011/0310713 | A1 | * | 12/2011 | Komura   | G11B 5/6088 360/245.4 |
| 2014/0131309 | A1 | * | 5/2014  | Nishijima | G11B 5/1272 216/22 |

(Continued)

OTHER PUBLICATIONS

Barnes, W.L. et al., "Surface Plasmon Subwavelength Optics", Nature, vol. 424, pp. 824-830, Aug. 2003.

(Continued)

*Primary Examiner* — Peter Vincent Agustin
(74) *Attorney, Agent, or Firm* — DLA Piper LLP (US)

(57) ABSTRACT

The present embodiments relate to a heat-assisted magnetic recording (HAMR) write head with an iridium (Ir) film. The Ir film can include a body layer and a plasmon generator (PG) film comprising Iridium with a thin Ir seed layer. The Ir seed layer can be in direct contact with a dielectric (aluminum oxide). The thickness of the Ir film can be 40 nanometers or less including both a body layer and the seed layer. Incorporating Iridium as a material used for a PG can be a high surface plasmon efficient material with also being reliable under high temperature irradiation during a heat-assisted writing process.

19 Claims, 11 Drawing Sheets

(56) References Cited

U.S. PATENT DOCUMENTS

2016/0115612 A1* 4/2016 Ikegawa .............. G11B 5/3123
　　　　　　　　　　　　　　　　　　　　　　205/122
2017/0221505 A1 　8/2017 Staffaroni et al.

OTHER PUBLICATIONS

Challener, W.A. et al., "Heat-Assisted Magnetic Recording by a Near-Field Transducer with Efficient Optical Energy Transfer", Nature Photonics, vol. 3, pp. 220-224, Apr. 2009.
Wang, X. et al., "HAMR Recording Limitations and Extendibility", IEEE Transactions on Magnetics, vol. 49, No. 2, pp. 686-692, Feb. 2013.

* cited by examiner

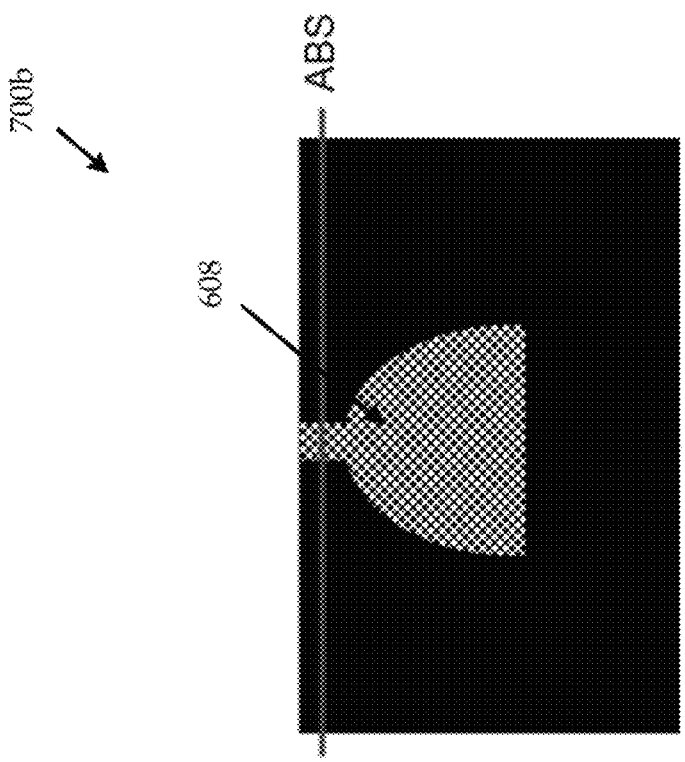
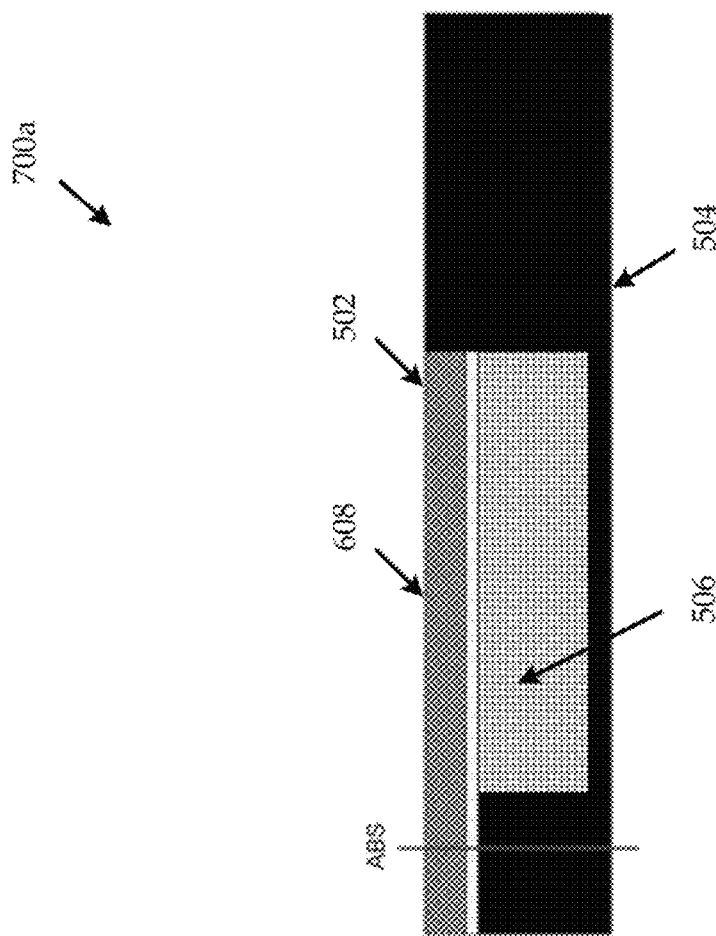
FIG. 7B
FIG. 7A

IRIDIUM FILM WITH A THIN IRIDIUM TEMPLATE LAYER FOR A HEAT-ASSISTED MAGNETIC RECORDING (HAMR) WRITER

TECHNICAL FIELD

Embodiments of the invention relate to the field of electro-mechanical data storage devices. More particularly, embodiments of the invention relate to the field of a heat-assisted magnetic recording (HAMR) write head for a hard disk drive (HDD) incorporating an iridium film.

BACKGROUND

Volumes of digital data can be stored on a disk drive, such as a Hard disk drive (HDD). The disk drive can comprise a head that can interact with a magnetic recording medium (e.g., a disk) to read and write magnetic data onto the disk. For instance, the disk drive can include a write head that is positioned near the disk and can modify a magnetization of the disk passing immediately under the write head.

Disk drives can utilize various technologies to write to a disk. For example, perpendicular magnetic recording (PMR) can relate to magnetic bits on a disk are directed perpendicular (e.g., either up or down) relative to the disk surface. PMR recording can increase storage density to the disk by aligning poles of magnetic elements on the disk perpendicularly to the surface of the disk. Further, heat-assisted magnetic recording (HAMR) write heads can include a heating element (e.g., a light source) to heat the magnetic recording medium. HAMR-based write heads can allow for increased capacity for storing digital data on the magnetic recording medium.

SUMMARY

A head for a disk drive is described. Particularly, the present embodiments relate to a heat-assisted magnetic recording (HAMR) write head with an Iridium film. A first example embodiment provides a heat-assisted magnetic recording (HAMR) write head. The HAMR write head can include a main pole comprising a magnetic material. The HAMR write head can also include a plasmon generator (PG) portion comprising an Iridium (Ir) film. The HAMR write head can also include a first dielectric spacer layer disposed between the main pole and the PG portion.

In some instances, the PG portion further comprises a body layer comprising Iridium and a seed layer disposed adjacent to the body layer, the seed layer comprising Iridium.

In some instances, at least a portion of the first dielectric spacer layer comprises aluminum oxide (Al2O3). In some instances, the HAMR write head further comprises a non-magnetic main pole spacer layer disposed between the main pole and any of the first dielectric spacer portion and a heat sink.

In some instances, a thickness of the PG portion is 40 nanometers or less. In some instances, the HAMR write head further comprises a BSH layer and a second dielectric layer. The PG portion can be disposed adjacent to both the BSH layer and the second dielectric layer.

In some instances, the body layer is disposed over the seed layer. In some instances, the body layer and the seed layer are patterned to form the body layer and the seed layer to a target dimension.

In some instances, the first dielectric layer is disposed over the plasmon generation portion. A resist mask can be applied over the first dielectric layer, with a portion of the first dielectric layer being etched.

In another example embodiment, a method for manufacturing a write head is provided. The method can include disposing a seed layer over a BSH layer and a first dielectric spacer. The seed layer can include iridium (Ir). The method can also include disposing a body layer over the seed layer. The body layer can also include Ir. The method can also include disposing a second dielectric spacer over the body layer.

The method can also include disposing a heat sink over the body layer. The method can also include disposing a non-magnetic spacer layer over the heat sink and the second dielectric spacer. The method can also include disposing a main pole portion over the non-magnetic spacer layer.

In some instances, the method can include adding a structural layer over the seed layer. The structural layer can increase an adhesion between the seed layer and the body layer.

In some instances, the method can include patterning the body layer and the seed layer to comprise a PEG target dimension. In some instances, a thickness of the body layer and the seed layer is less than 400A, and the seed layer has a thickness between 10A and 30A. In some instances, at least a portion of the heat sink comprises gold (Au).

In some instances, the method can include, responsive to disposing the second dielectric spacer, applying a resist mask over the seed layer and a portion of the body layer, and performing an ion beam etching (IBE) process to remove a portion of the second dielectric spacer.

In another example embodiment, a write head is provided. The write head comprises a main pole comprising a magnetic material. The write head can also include a body layer comprising Iridium (Ir). The write head can also include a seed layer disposed adjacent to the body layer, the seed layer comprising Iridium. The write head can also include a first dielectric spacer disposed adjacent to the seed layer. The write head can also include a second dielectric spacer disposed adjacent to the body layer. The write head can also include a non-magnetic spacer disposed between the main pole and any of the second dielectric spacer and a heat sink.

In some instances, at least a portion of the first dielectric spacer comprises aluminum oxide (Al2O3). In some instances, a thickness of the body layer and the seed layer is less than 400A, and the seed layer has a thickness between 10A and 30A.

In some instances, the body layer and the seed layer are patterned to comprise a PEG target dimension. In some instances, responsive to disposing the second dielectric spacer over the body layer, a resist mask is added over the seed layer and a portion of the body layer, and an ion beam etching (IBE) process is performed to remove a portion of the second dielectric spacer.

Other features and advantages of embodiments of the present invention will be apparent from the accompanying drawings and from the detailed description that follows.

BRIEF DESCRIPTION OF THE DRAWINGS

Embodiments of the present invention are illustrated by way of example and not limitation in the figures of the accompanying drawings, in which like references indicate similar elements and in which:

FIGS. 7A-7B illustrate a third cross-section view and a top view of a HAMR write head structure according to an embodiment.

DETAILED DESCRIPTION

A disk drive can use a magnetic write head to interact with a magnetic recording medium to modify digital data stored on the magnetic recording medium. Increasing a magnetic recording areal density of a disk drive may require a smaller grain size in the magnetic recording media, which can reduce overall storage lifetime. Accordingly, to lower a grain size for the magnetic recording medium and maintain durable storage lifetime, a thermal stability of the magnetic recording medium can be increased. Increasing the thermal stability of the magnetic recording medium can result in a magnetic field generated by a magnetic writer main pole as well as a current from a coil around the main pole not being strong enough to switch the magnetic media bits for data recording.

In response, a disk drive can implement heat-assisted magnetic recording (HAMR) techniques. HAMR-based write heads can use heat energy to reduce the energy barrier of the grains of the magnetic recording media while writing the data with magnetic recording field. In many HAMR techniques, the heating source can be produced by near-field light. The near-field light can be generated from plasmons excited by irradiation with light through a metal layer. In HAMR, a laser beam from through the waveguide a laser diode can be used as the irradiation source. Metal films can be able to generate near field efficiently by exciting a Surface Plasmon (SP) or surface wave of free electrons bounded on the metal-dielectric interface. Further, a structure and geometry of a Plasmon Generator (PG) can be engineered to enable efficient energy transfer from waveguide to PG, to excite local surface plasmon resonance, and to utilize lightning rod effect to further improve field confinement. This metallic nanostructure can include the PG or a Near-Field Transducer (NFT).

In some instances, a Self-Aligned gold-rhodium (Au—Rh) bi-layer structure can be provided. This structure can also be referred to as "Rh-D1." In many instances, platinum-group materials, such as Rh, Ru, Pd, Pt, TiN, or ZrN, can be used as PG materials to provide both optical properties and robustness. However, iridium is not commonly used as a PG material.

PG materials may need to be a high-SP efficient material, but also have to be reliable under high temperature irradiation during a HAMR (or Thermally Assisted Magnetic Recording (TAMR)) writing process. For instance, Rh can be particularly preferred in terms of good optical properties due to the large availability of free electrons and the low optical absorption in plasmonic metals. Under high temperature writing operation, the PG materials may have to be kept metallic state instead of forming an oxide. For instance, Rh oxidation can degrade the optical properties and can lead to an increase in PG temperature.

Figure 1:
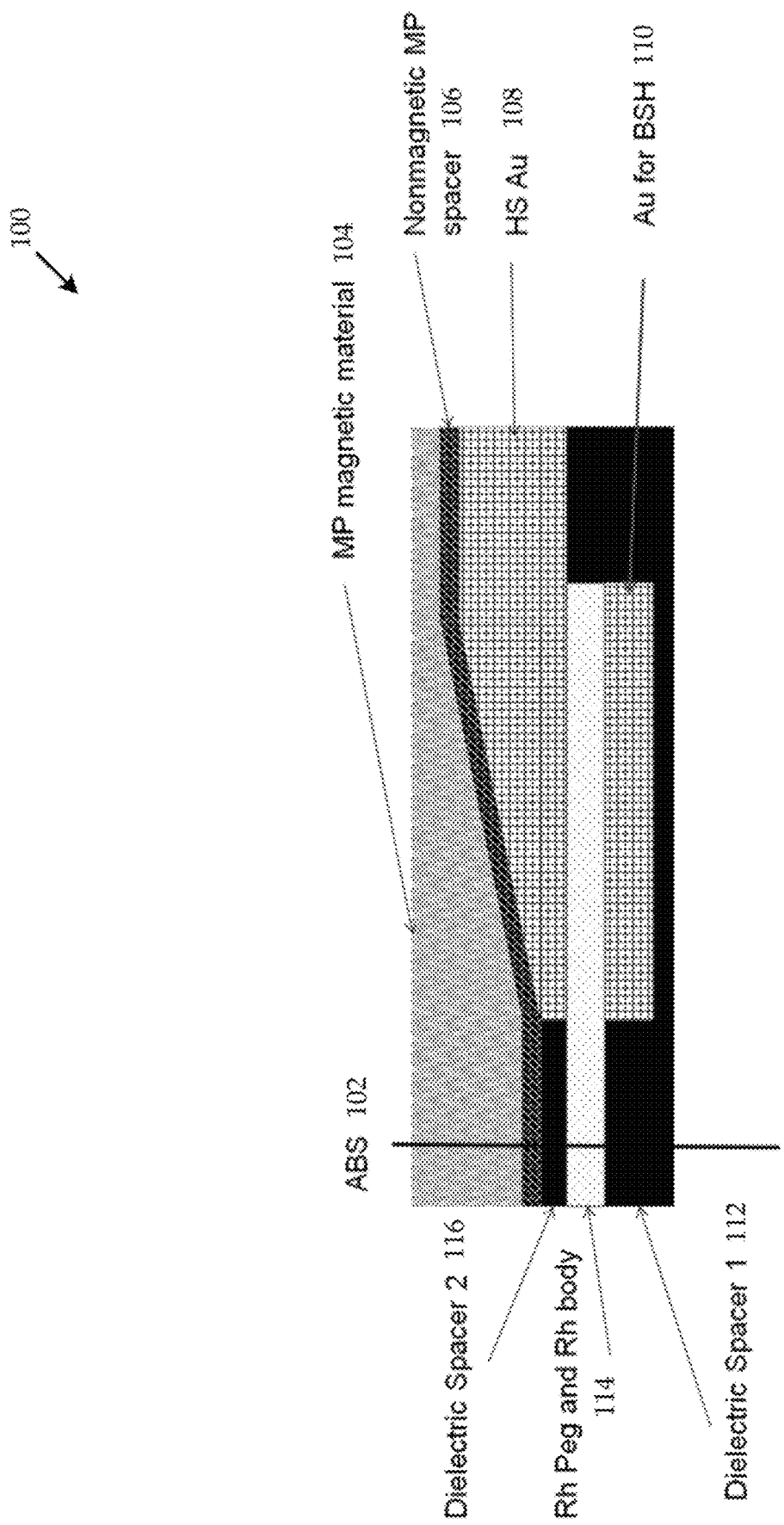
FIG. 1 shows a cross-section view of a portion of an example HAMR writer according to an embodiment.

FIG. 1 shows a cross-section view of a portion of an example HAMR writer 100. As shown in FIG. 1, a PEG Rh film (e.g., 114) can be disposed over a substrate that includes a BSH Au portion (e.g., 110) and a Dielectric Spacer 1 portion (e.g., 112).

In FIG. 1, the HAMR writer 100 can include a main pole (MP) magnetic material 104 disposed above a non-magnetic MP spacer 106 and a gold (Au) heat sink 108. Further, along an air-bearing surface 102, a first dielectric spacer 112 and a second dielectric spacer 116 can be disposed between an Rh PEG and Rh body 114. An Au BSH material 110 can be disposed between the Rh PEG and Rh body 114 and the first dielectric spacer 112.

While Iridium (Ir) is a very thermally robust material, there are various considerations with incorporating such a material into a structure as described herein. In many cases, a design of a structure can be called a bi-layer PPG. With a bi-layer PPG, a position where near-field light is most concentrated and becomes hot is in contact with a dielectric, such as a Al2O3 or SiO2 material. However, an Ir film generally has a high mechanical film stress and can have a poor adhesion to such dielectric materials. Inserting an adhesion layer comprising a Ta or Zr material at the interface between the dielectric and Ir can improve adhesion, but it may worsen the concentration effect of near-field light. In order to reduce the mechanical stress of an Ir film, the film density can be reduced by adjusting the film deposition conditions, which also can reduce the concentration efficiency of near-field light.

The present embodiments can include a write head structure that can include a thin Ir seed layer formed by a method as an adhesion layer. The seed layer can be formed by repeating a film deposition and etching multiple times on a continuously rotating substrate. Further, a thickness of the film can be adjusted. For instance, the seed layer can include a combination of a Al2O3 or a dielectric material comprising Al2O4 as a main component.

Further, the present embodiments can include an Ir film thickness limited to 40 nm or less, including the seed layer, to suppress the increase in mechanical stress of the Ir film. The PG film can include Iridium (Ir) and can be part of a thin Ir seed layer. The Ir seed layer can be in direct contact with Al2O3 or a dielectric material comprising Al2O3 with no other adhesion layer. Further, a thickness of the Ir film can be limited to 40 nm or less, including the seed layer. The Ir film can be incorporated into a bi-layer PPG.

In some instances, the Ir PEG with a seed layer can be used as a PG material, which can improve the robustness of the PG while minimizing any ADC performance drop. Further, applying a thin Ir seed layer between an Ir body and a first dielectric spacer (Al2O3) can avoid any delamination in a wafer production process. The delamination can be caused by very high mechanical stress of the Ir film. This can provide a more robust PEG Ir film in HAMR device operation.

A write head can include a HAMR-type write head with a bi-layer PPG structure using an Ir film as a PG material. The Ir film of a PEG can be in direct contact with a dielectric (e.g., including Al2O3) near an ABS, with a disorder layer at the interface. The film thickness of the Ir film at the PEG can be 400A or less. The Ir film can be two layers, including a seed layer between 10A-30A and another Ir body layer.

Figure 2:
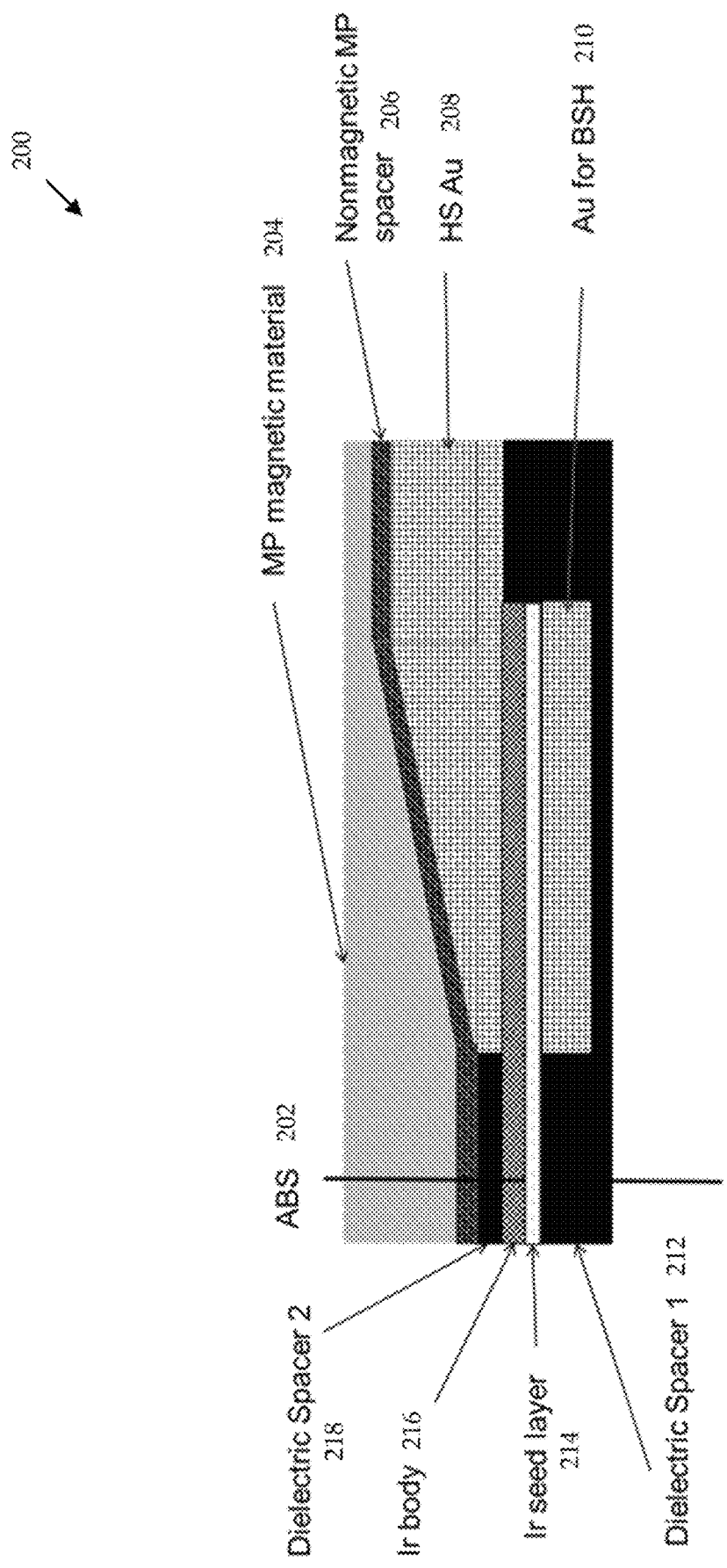
FIG. 2 is a cross-section view of an example HAMR writer according to an embodiment.

FIG. 2 is a cross-section view of an example HAMR writer 200. As shown in FIG. 2, the HAMR writer 200 can include a MP magnetic material 204 disposed above a non-magnetic MP spacer 206 and a Au heat sink 208. Further, disposed adjacent to an ABS 202 can include an Ir body 216 and an Ir seed layer 214 between dielectric spacers 212, 218. An Au BSH layer 210 can be disposed between the Ir seed layer 214 and the first dielectric spacer 212.

In FIG. 2, a full film Ir seed layer 214 and an Ir body film 216 can be disposed partially on a first dielectric spacer 212 and a BSH Au layer 210. The BSH layer can include the bottom planar plasmon generator, which can include an Au material. Above the first dielectric spacer 212, the Ir seed 214 and Ir film 216 can then be patterned as a narrow rod facing a writer ABS direction. Above the BSH Au layer 210, the Ir seed and film can be patterned into a wider parabola shape for PEG designed dimensions.

Figure 3:
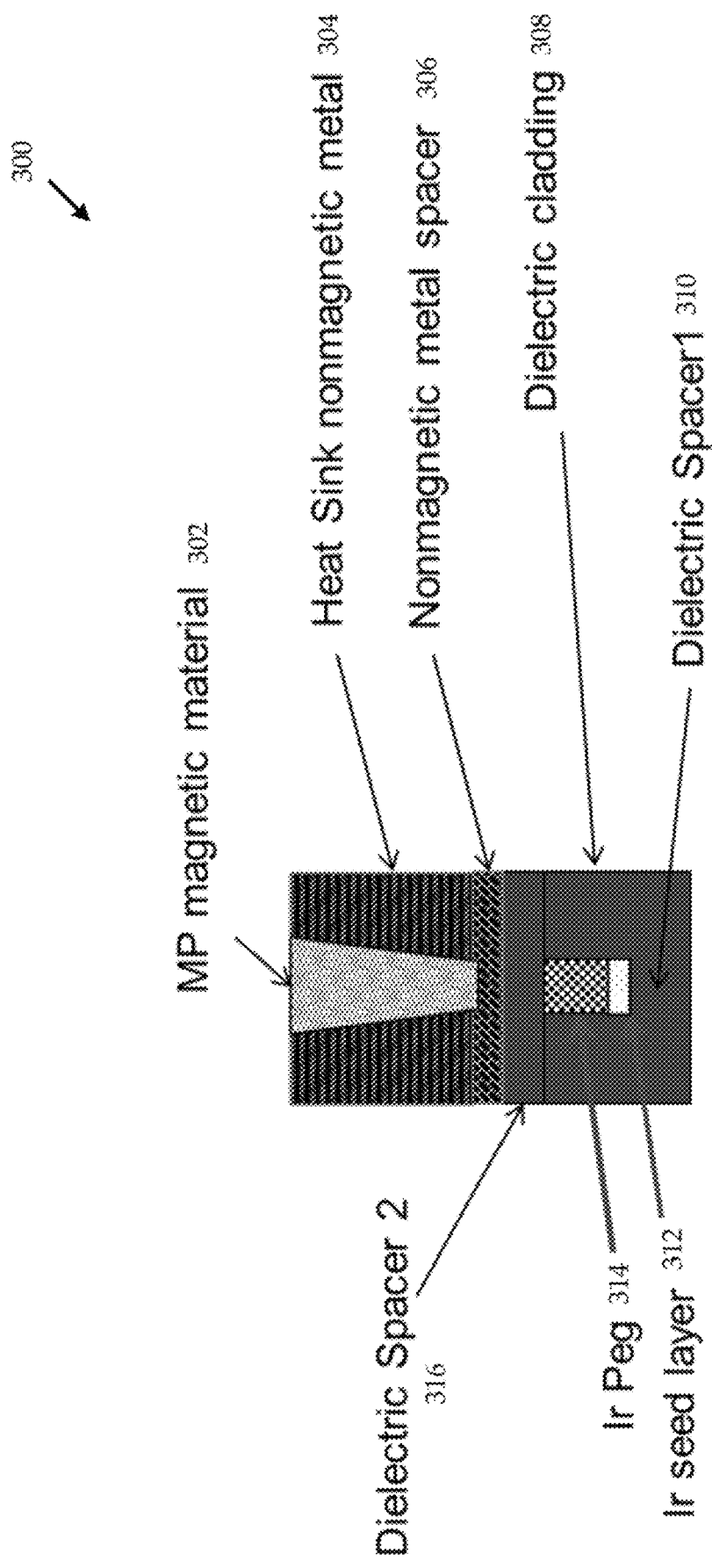
FIG. 3 is an ABS view of a portion of a HAMR writer structure according to an embodiment.

FIG. 3 is an ABS view of a portion of a HAMR writer structure 300 as described herein. As shown in FIG. 3, a MP magnetic material 302 can be disposed within a heat sink non-magnetic material 314. Below the heat sink nonmagnetic metal 304 can include a non-magnetic metal spacer 306 and a second dielectric spacer 316. Further, a dielectric cladding 308 can be disposed around an Ir PEG 314 and an Ir seed layer 312, with a first dielectric spacer 310 disposed below the Ir seed layer 312 and the cladding 308.

Figure 4B:
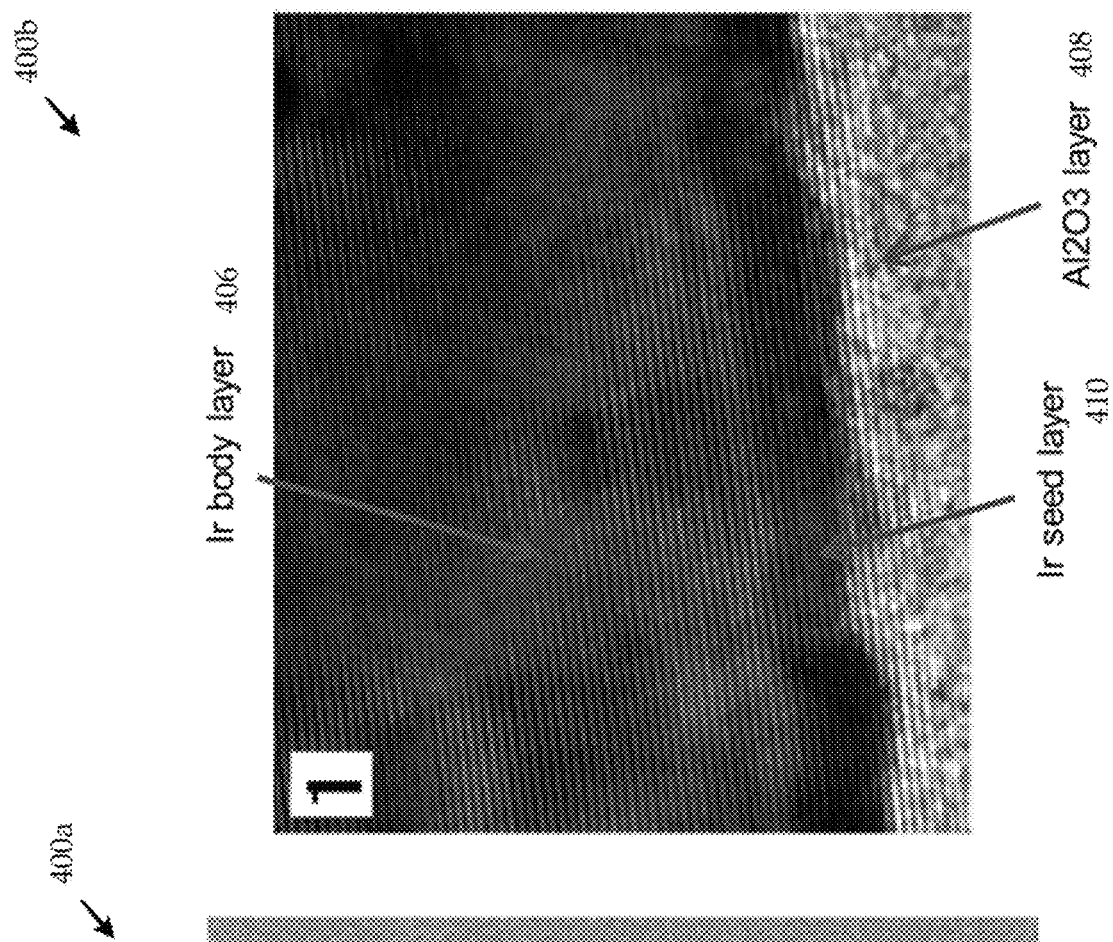
FIGS. 4A-4B show cross-sectional images of a HAMR head structure according to an embodiment.
Figure 4A:
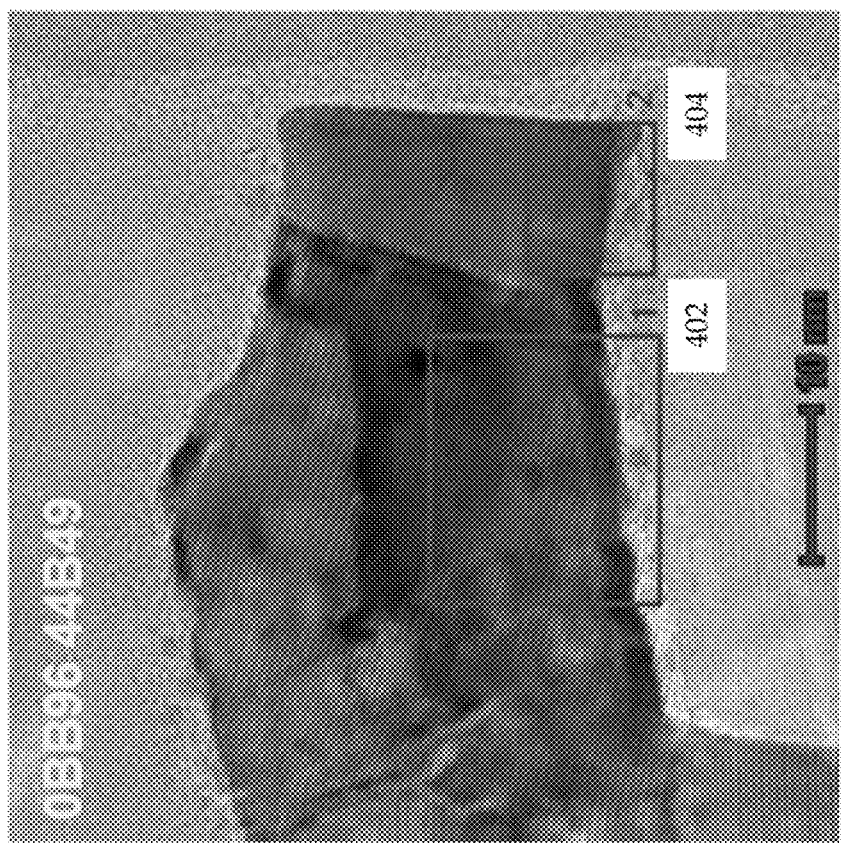

FIGS. 4A-4B show cross-sectional images 400a, 400b of a HAMR head structure as described herein. For instance, the images 400a, 400b can depict a tip portion of a PEG near the ABS. As can be seen in FIGS. 4A-4B, the seed layer (e.g., 410) and the body layer (e.g., 406) can have a different crystallinity, and the contrast can be different in the images. In some embodiments, the contrast difference may not occur. For instance, in area 404, there may not be a difference in contrast between seed and body.

A structural disorder can be observed on the surface of the Al2O3 layer 408 in contact with the Ir seed layer 410. This can be caused by the etching process of the Ir seed layer 410.

To manufacture a thin Ir seed layer, a process can be performed. The process can include sputter etching to remove 5A of Al2O3 in a physical vapor deposition (PVD) chamber. This can include a cleaning process before film deposition. The process can also include a 10~20 Angstrom thick Ir film being deposited by Direct Current (DC) Sputtering in the chamber. Here, the base pressure of the chamber can be around $3 \times 10^{-5}$ Pa or less, Krypton (Kr) gas flow can be around 15 standard cubic centimeters per minute (sccm), and pressure in the chamber during the deposition can be around 0.1 Pa. Then, the process can include removing a 5~15A Ir film by sputter etching. This sputter etching process can selectively remove a part of the Ir film that adheres to Al2O3. The process can be repeated until the target seed layer thickness is obtained. The typical cycle time is about 2 to 5 times. The body Ir layer can be deposited on the Ir seed layer. The sum of the seed layer and the body layer can be set so that it does not exceed 400A.

To apply the Ir film stack (e.g., an Ir seed layer and an Ir body layer), a number of process steps can be implemented. FIGS. 5-10 illustrate examples of manufacturing a HAMR write structure with an Ir film stack as described herein.

Figure 5:
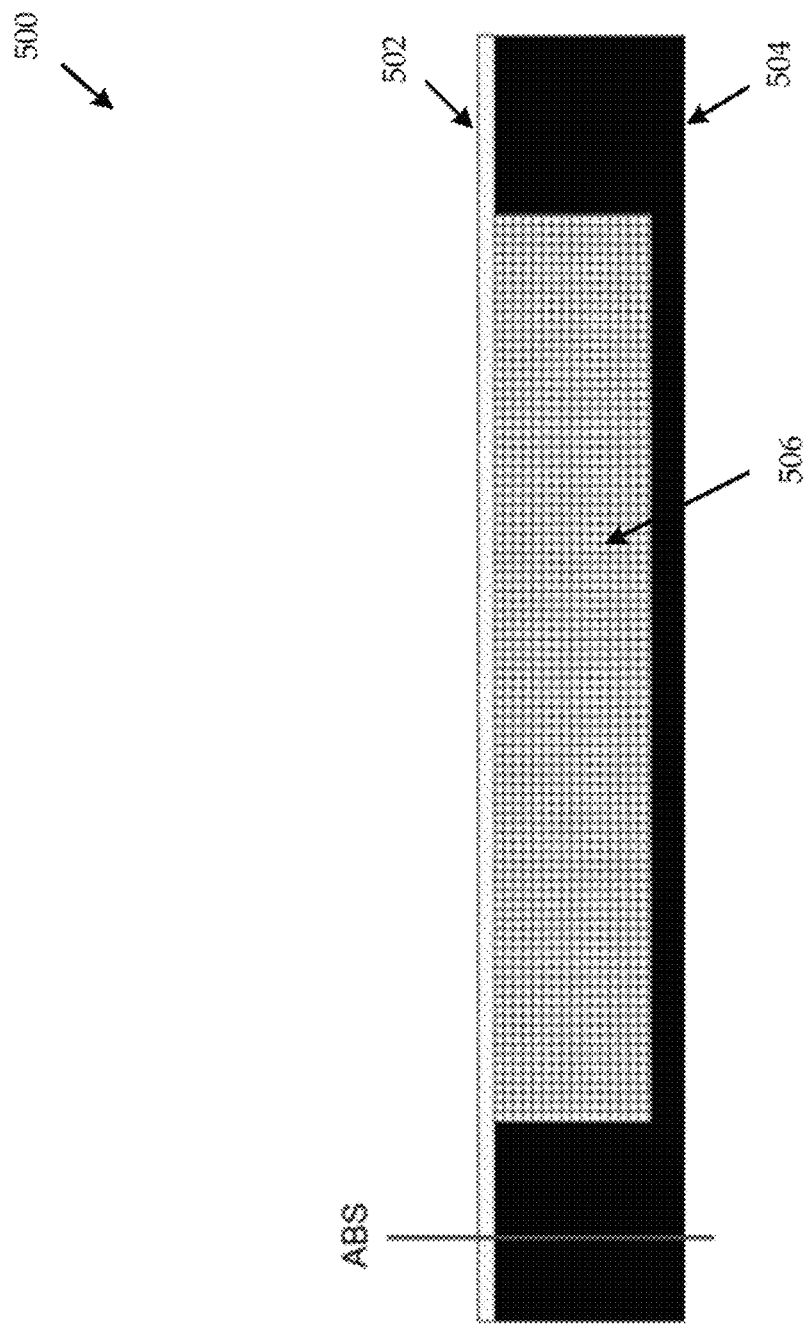
FIG. 5 illustrates a first cross-section of a HAMR write head structure according to an embodiment.

FIG. 5 illustrates a first cross-section 500 of a HAMR write head structure. As shown in FIG. 5, an Ir seed layer 502 can be applied above a BSH Au layer 506 and a first dielectric spacer 504. Here, Al2O3 or a dielectric containing Al2O3 as a main component can be used for the first dielectric spacer 504. In some instances, a structural disorder layer, with a typical thickness around 1-20A, and a typical material comprising Al, Zr, Ta, or Y, can be formed on the surface of the first dielectric spacer 504, which can enhance adhesion to the Ir seed layer.

Figure 6:
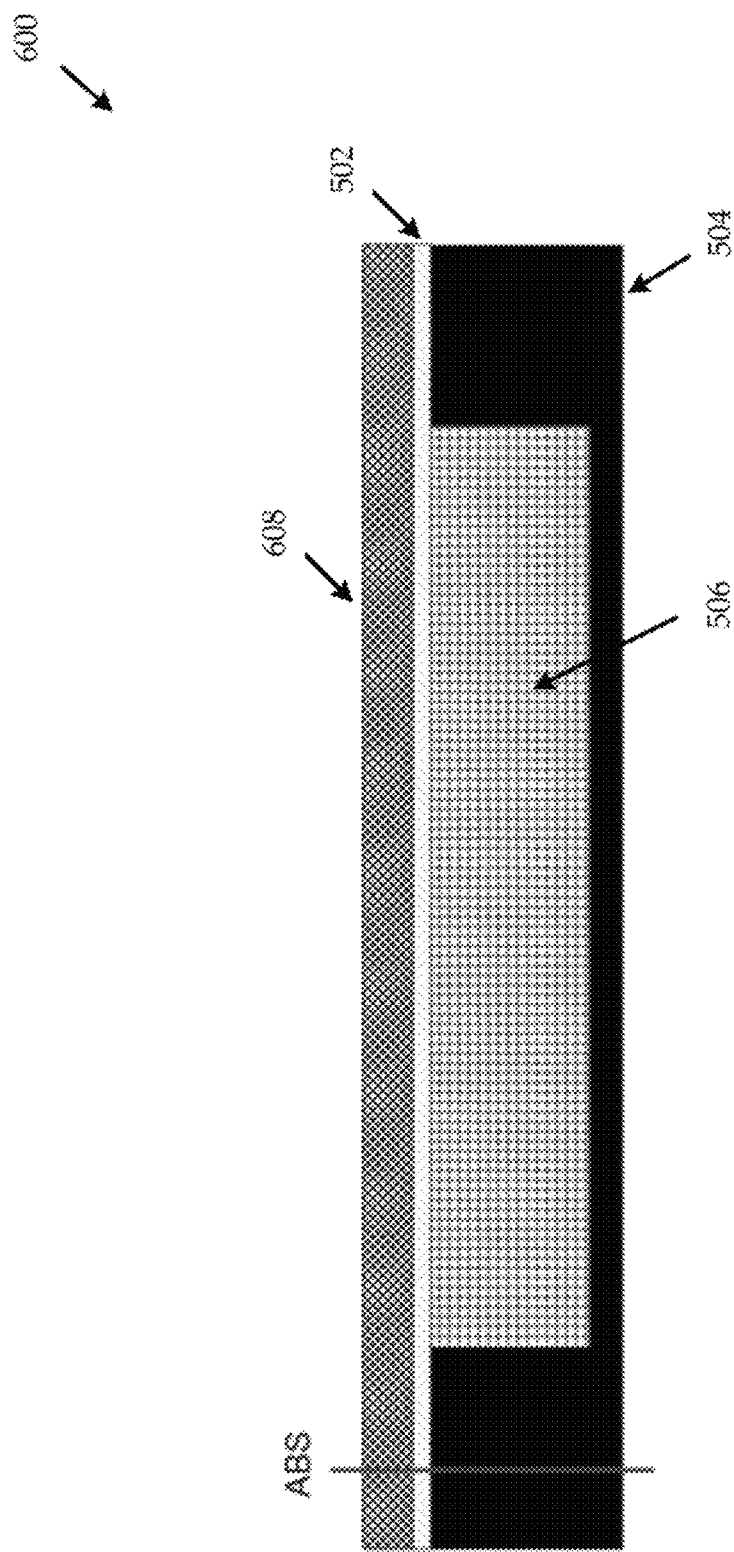
FIG. 6 illustrates a second cross-section of a HAMR write head structure according to an embodiment.

FIG. 6 illustrates a second cross-section 600 of a HAMR write head structure. As shown in FIG. 6, an Ir body layer 608 can be disposed on the Ir seed layer 602.

FIGS. 7A-7B illustrate a third cross-section view 700a and a top view 700b of a HAMR write head structure. As shown in FIGS. 7A-7B, the Ir body layer 608 and the Ir seed layer 502 can be patterned and polished to a PEG dimension target.

Figure 8:
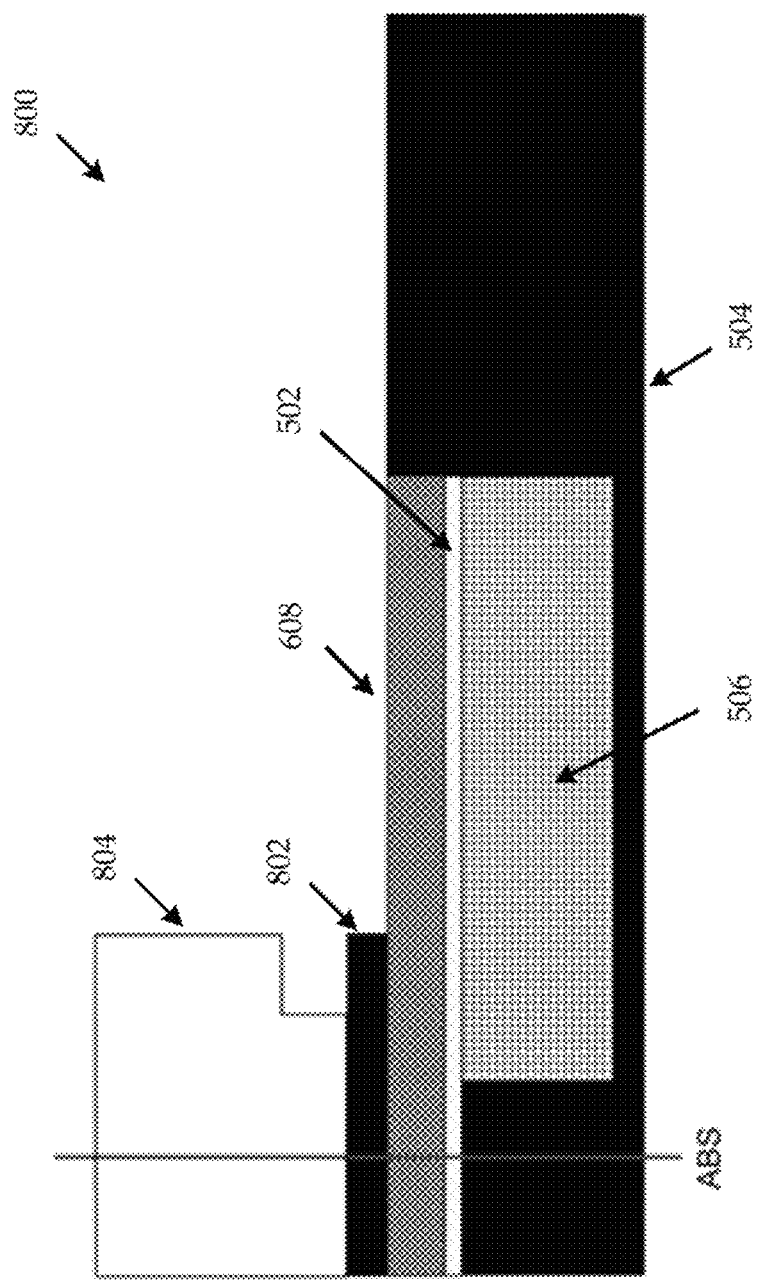
FIG. 8 illustrates a fourth cross-section of a HAMR write head structure according to an embodiment.

FIG. 8 illustrates a fourth cross-section 800 of a HAMR write head structure. As shown in FIG. 8, a second dielectric spacer 802 can be deposed over the Ir body layer 608. After deposition of spacer 802, a resist mask 804 can be added over the Ir PEG and a part of the Ir body 608. Then an ion beam etching (IBE) etching process can be performed to remove part of the dielectric spacer 802.

Figure 9:
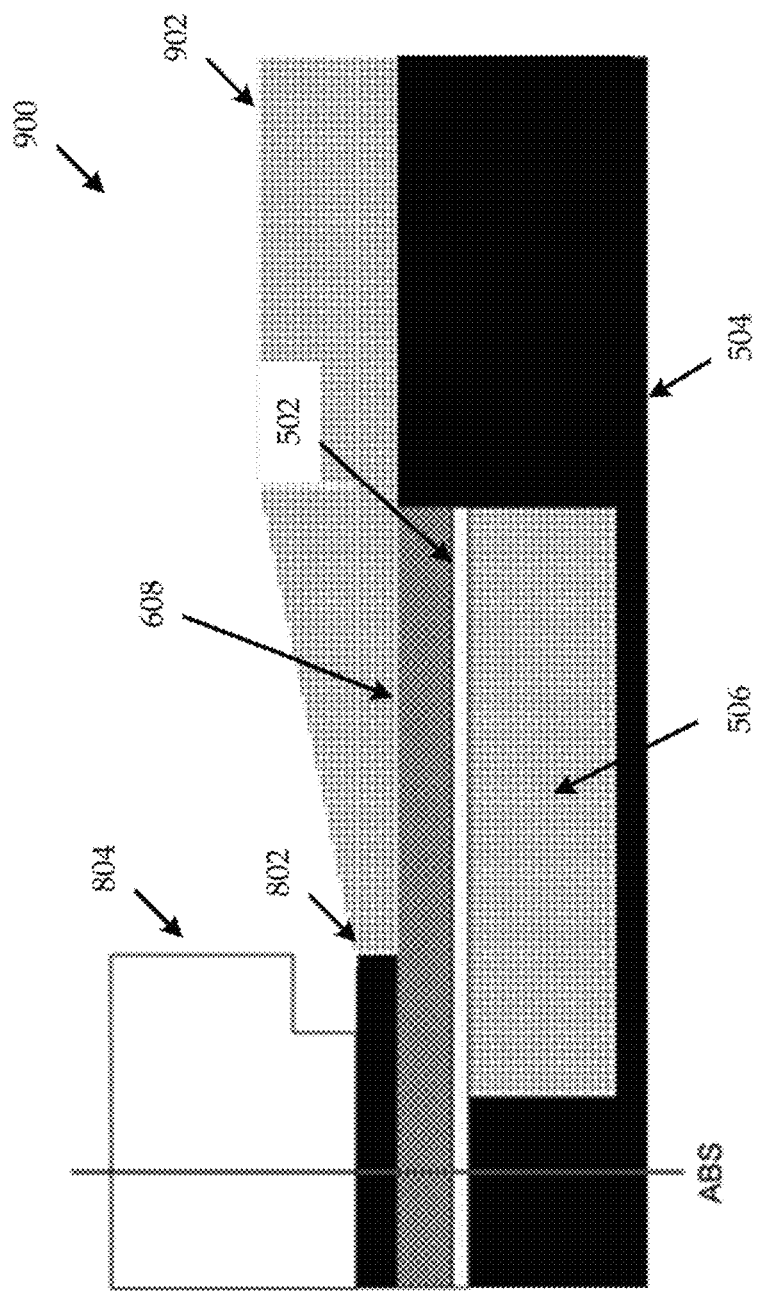
FIG. 9 illustrates a fifth cross-section of a HAMR write head structure according to an embodiment.

FIG. 9 illustrates a fifth cross-section 900 of a HAMR write head structure. As shown in FIG. 9, a heat sink 902 can be added by an IBE process with an incident angle. The heat sink 902 can include gold (Au) and can thin near the resist area due to a shadow effect of the resist.

Figure 10:
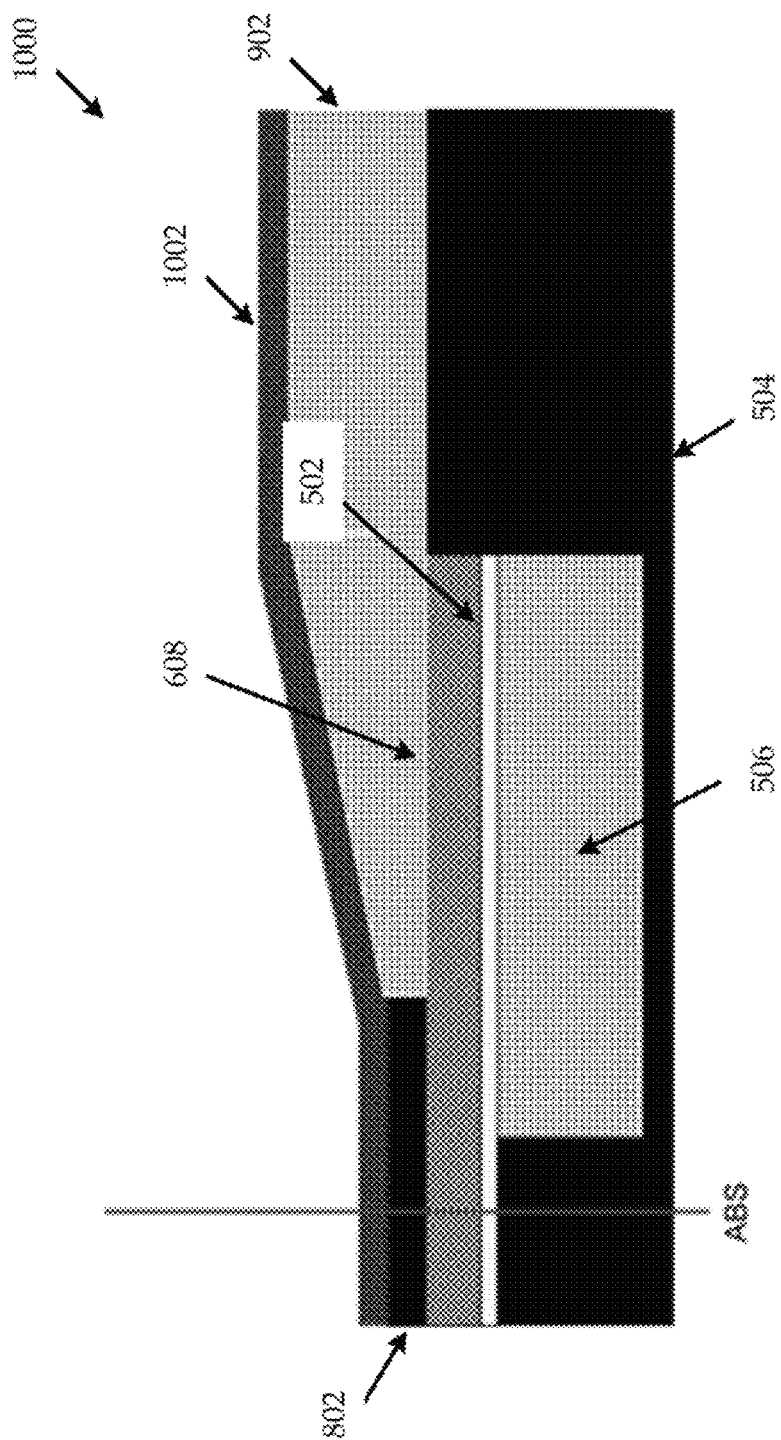
FIG. 10 illustrates a sixth cross-section of a HAMR write head structure according to an embodiment.

FIG. 10 illustrates a sixth cross-section 1000 of a HAMR write head structure. As shown in FIG. 10, a non-magnetic metallic spacer 1002, which can include a stopper layer of Au diffusion into the main pole, with a typical material comprising Ru, Ir, or Rh, and a typical thickness being more than 50A through 200A, can be disposed above a second dielectric spacer 802.

Figure 11:
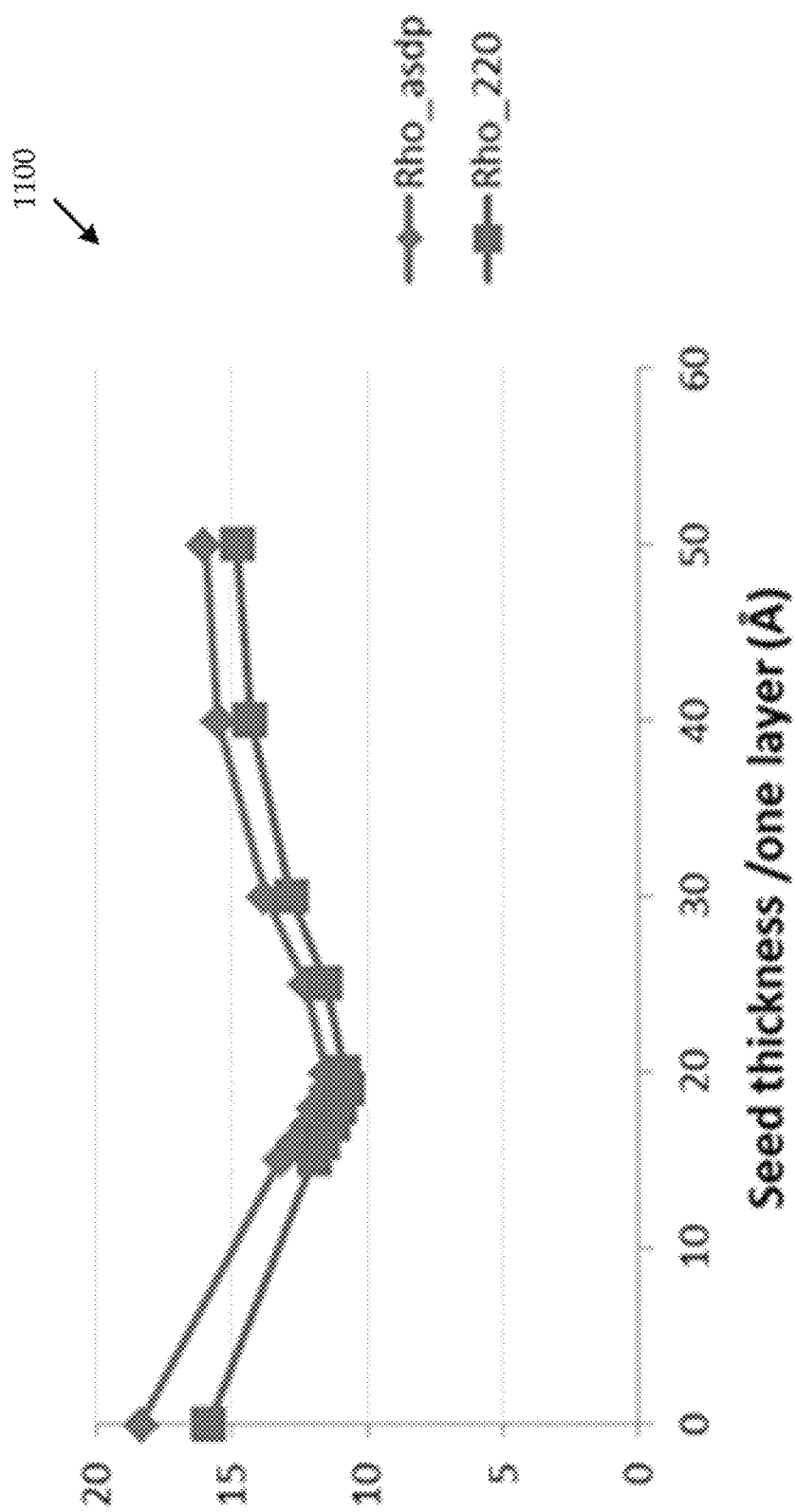
FIG. 11 is a graphical representation showing the relationship between the film thickness of the Ir seed layer and the resistivity of the entire film according to an embodiment.

FIG. 11 is a graphical representation 1100 showing the relationship between the film thickness of the Ir seed layer and the resistivity of the entire film. In this example, the overall film thickness can be fixed at 400A by adjusting the body Ir film thickness. Low resistivity can expect that the film density is high and a high near-field light concentration effect can be obtained. According to the representation in FIG. 11, it can be seen that 10A to 30A can be the preferred seed layer film thickness range under both as deposited (asdp) and 220degC-3 hrs annealing conditions (220).

In a first example embodiment, a heat-assisted magnetic recording (HAMR) write head is provided. The HAMR write head can include a main pole (e.g., 204 in FIG. 2) comprising a magnetic material. The HAMR write head can also include a plasmon generator (PG) portion (e.g., 214, 216 in FIG. 2) comprising an Iridium (Ir) film. The HAMR write head can also include a first dielectric spacer layer (e.g., 218 in FIG. 2) disposed between the main pole and the PG portion.

In some instances, the PG portion further comprises a body layer (e.g., 216 in FIG. 2) comprising Iridium and a seed layer (e.g., 214 in FIG. 2) disposed adjacent to the body layer, the seed layer comprising Iridium.

In some instances, at least a portion of the first dielectric spacer layer comprises aluminum oxide (Al2O3). In some instances, the HAMR write head further comprises a non-magnetic main pole spacer layer (e.g., 206 in FIG. 2) disposed between the main pole and any of the first dielectric spacer portion and a heat sink (e.g., 208 in FIG. 2).

In some instances, a thickness of the PG portion is 40 nanometers or less. In some instances, the HAMR write head further comprises a BSH layer (e.g., 210 in FIG. 2) and a second dielectric layer (e.g., 212 in FIG. 2). The PG portion can be disposed adjacent to both the BSH layer and the second dielectric layer.

In some instances, the body layer is disposed over the seed layer. In some instances, the body layer and the seed layer are patterned (e.g., as described in FIG. 7) to form the body layer and the seed layer to a target dimension.

In some instances, the first dielectric layer is disposed over the plasmon generation portion. A resist mask can be applied over the first dielectric layer (e.g., as described in FIG. 8), with a portion of the first dielectric layer being etched.

In another example embodiment, a method for manufacturing a write head is provided. The method can include disposing a seed layer over a BSH layer and a first dielectric spacer. The seed layer can include iridium (Ir). The method can also include disposing a body layer over the seed layer. The body layer can also include Ir. The method can also include disposing a second dielectric spacer over the body layer.

The method can also include disposing a heat sink over the body layer. The method can also include disposing a non-magnetic spacer layer over the heat sink and the second dielectric spacer. The method can also include disposing a main pole portion over the non-magnetic spacer layer.

In some instances, the method can include adding a structural layer over the seed layer. The structural layer can increase an adhesion between the seed layer and the body layer.

In some instances, the method can include patterning the body layer and the seed layer to comprise a PEG target dimension. In some instances, a thickness of the body layer and the seed layer is less than 400A, and the seed layer has a thickness between 10A and 30A. In some instances, at least a portion of the heat sink comprises gold (Au).

In some instances, the method can include, responsive to disposing the second dielectric spacer, applying a resist mask over the seed layer and a portion of the body layer, and performing an ion beam etching (IBE) process to remove a portion of the second dielectric spacer.

In another example embodiment, a write head is provided. The write head comprises a main pole (e.g., 204) comprising a magnetic material. The write head can also include a body layer (e.g., 216) comprising Iridium (Ir). The write head can also include a seed layer (e.g., 214) disposed adjacent to the body layer, the seed layer comprising Iridium. The write head can also include a first dielectric spacer (e.g., 212) disposed adjacent to the seed layer. The write head can also include a second dielectric spacer (e.g., 218) disposed adjacent to the body layer. The write head can also include a non-magnetic spacer (e.g., 206) disposed between the main pole and any of the second dielectric spacer and a heat sink.

In some instances, at least a portion of the first dielectric spacer comprises aluminum oxide (Al2O3). In some instances, a thickness of the body layer and the seed layer is less than 400A, and the seed layer has a thickness between 10A and 30A.

In some instances, the body layer and the seed layer are patterned to comprise a PEG target dimension. In some instances, responsive to disposing the second dielectric spacer over the body layer, a resist mask is added over the seed layer and a portion of the body layer, and an ion beam etching (IBE) process is performed to remove a portion of the second dielectric spacer.

It will be understood that terms such as "top," "bottom," "above," "below," and x-direction, y-direction, and z-direction as used herein as terms of convenience that denote the spatial relationships of parts relative to each other rather than to any specific spatial or gravitational orientation. Thus, the terms are intended to encompass an assembly of component parts regardless of whether the assembly is oriented in the particular orientation shown in the drawings and described in the specification, upside down from that orientation, or any other rotational variation.

It will be appreciated that the term "present invention" as used herein should not be construed to mean that only a single invention having a single essential element or group of elements is presented. Similarly, it will also be appreciated that the term "present invention" encompasses a number of separate innovations, which can each be considered separate inventions. Although the present invention has been described in detail with regards to the preferred embodiments and drawings thereof, it should be apparent to those skilled in the art that various adaptations and modifications of embodiments of the present invention may be accomplished without departing from the spirit and the scope of the invention. Accordingly, it is to be understood that the detailed description and the accompanying drawings as set forth hereinabove are not intended to limit the breadth of the present invention, which should be inferred only from the following claims and their appropriately construed legal equivalents.

What is claimed is:

1. A heat-assisted magnetic recording (HAMR) write head comprising:
    a body layer comprising Iridium;
    a seed layer disposed adjacent to the body layer, the seed layer comprising Iridium;
    a main pole comprising a magnetic material;
    a plasmon generator (PG) portion comprising an Iridium (Ir) film; and
    a first dielectric spacer layer disposed between the main pole and the PG portion.

2. The HAMR write head of claim 1, wherein at least a portion of the first dielectric spacer layer comprises aluminum oxide (Al2O3).

3. The HAMR write head of claim 1, further comprising:
    a non-magnetic main pole spacer layer disposed between the main pole and any of the first dielectric spacer portion and a heat sink.

4. The HAMR write head of claim 1, wherein a thickness of the PG portion is 40 nanometers or less.

5. The HAMR write head of claim 1, further comprising:
    a bottom planar plasmon generator (BSH) layer; and
    a second dielectric layer, wherein the PG portion is disposed adjacent to both the BSH layer and the second dielectric layer.

6. The HAMR write head of claim 1, wherein the body layer is disposed over the seed layer.

7. The HAMR write head of claim 1, wherein the body layer and the seed layer are patterned to form the body layer and the seed layer to a target dimension of 40 nanometers or less.

8. The HAMR write head of claim 1, wherein the first dielectric layer is disposed over the plasmon generation portion, and wherein a resist mask is applied over the first dielectric layer, with a portion of the first dielectric layer being etched.

9. A method for manufacturing a write head, the method comprising:
    disposing a seed layer over a bottom planar generator (BSH) layer and a first dielectric spacer, the seed layer comprising iridium (Ir);
    disposing a body layer over the seed layer, the body layer comprising Ir;
    disposing a second dielectric spacer over the body layer;
    disposing a heat sink over the body layer;

disposing a non-magnetic spacer layer over the heat sink and the second dielectric spacer; and disposing a main pole portion over the non-magnetic spacer layer.

10. The method of claim 9, further comprising:

adding a structural layer over the seed layer, the structural layer increasing an adhesion between the seed layer and the body layer.

11. The method of claim 9, further comprising:

patterning the body layer and the seed layer to comprise a PEG target dimension.

12. The method of claim 9, wherein a thickness of the body layer and the seed layer is less than 400A, and the seed layer has a thickness between 10A and 30A.

13. The method of claim 9, wherein at least a portion of the heat sink comprises gold (Au).

14. The method of claim 9, further comprising:

responsive to disposing the second dielectric spacer, applying a resist mask over the seed layer and a portion of the body layer; and performing an ion beam etching (IBE) process to remove a portion of the second dielectric spacer.

15. A write head comprising:

a main pole comprising a magnetic material;

a body layer comprising Iridium (Ir);

a seed layer disposed adjacent to the body layer, the seed layer comprising Iridium;

a first dielectric spacer disposed adjacent to the seed layer;

a second dielectric spacer disposed adjacent to the body layer; and a non-magnetic spacer disposed between the main pole and any of the second dielectric spacer and a heat sink.

16. The write head of claim 15, wherein at least a portion of the first dielectric spacer comprises aluminum oxide (Al2O3).

17. The write head of claim 15, wherein a thickness of the body layer and the seed layer is less than 400A, and the seed layer has a thickness between 10A and 30A.

18. The write head of claim 15, wherein the body layer and the seed layer are patterned to comprise a PEG target dimension.

19. The write head of claim 15, wherein, responsive to disposing the second dielectric spacer over the body layer, a resist mask is added over the seed layer and a portion of the body layer, and an ion beam etching (IBE) process is performed to remove a portion of the second dielectric spacer.

* * * * *